Feb. 18, 1936.  J. W. GRAY  2,031,533
COLUMN LEVEL GAUGE
Filed April 8, 1933
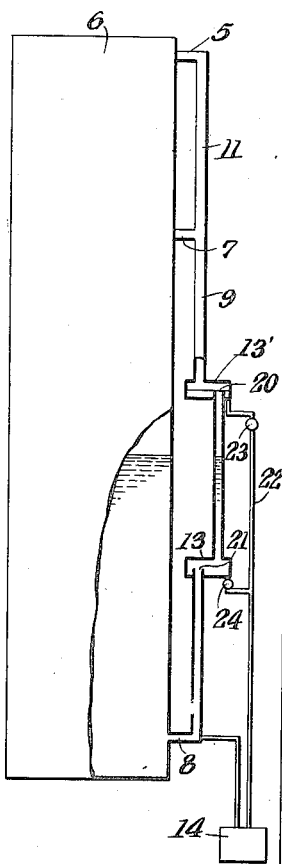
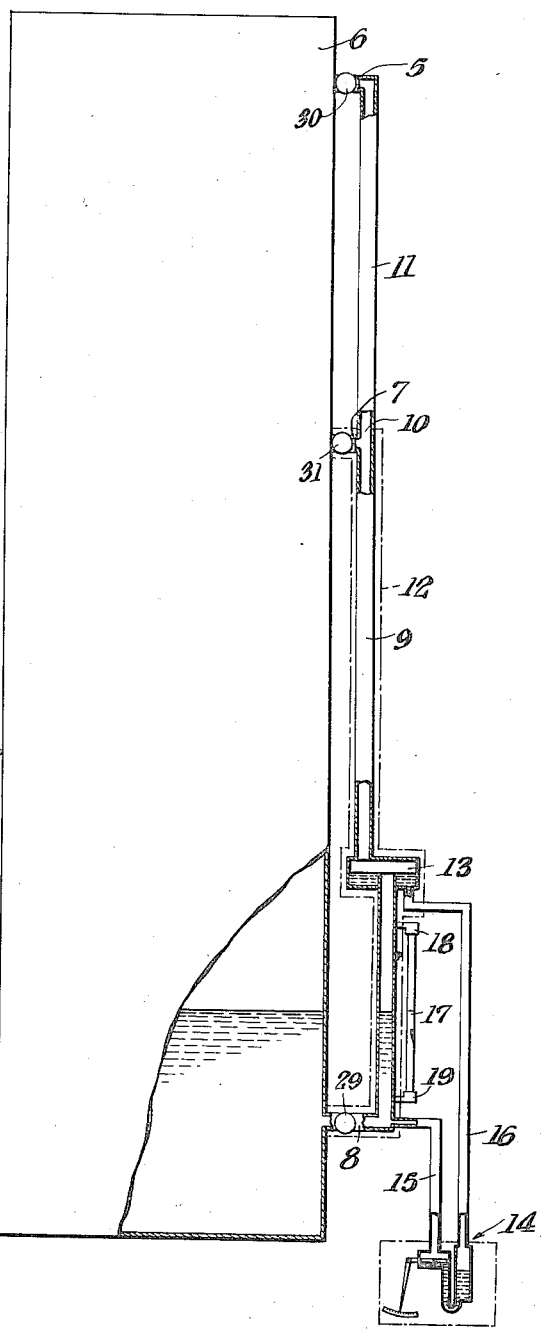
INVENTOR
JAMES W. GRAY
BY
ATTORNEY Patented Feb. 18, 1936

2,031,533

UNITED STATES PATENT OFFICE 2,031,533

COLUMN LEVEL GAUGE

James W. Gray, New York, N. Y.

Application April 8, 1933, Serial No. 665,095

7 Claims. (Cl. 73—54)

This invention relates to the gauging of liquids in the bottoms of fractionating columns and the like.

Such liquids, usually of a tarry viscous nature introduce peculiar difficulties in gauging, particularly if the oils be of a coking tendency. These difficulties have been such as to render gauges heretofore employed inaccurate and actually untrustworthy, leading to dangerous conditions in still operations.

The objects of the present invention are to overcome the difficulties mentioned and to provide in a simple practical form, a gauge structure which will be accurate and reliable.

The novel features of construction, combinations and relations of parts by which the foregoing and other desirable objects are attained are set forth in the following specification and broadly covered in the claims.

The drawing accompanying and forming part of the specification illustrates a number of the various possible embodiments of the invention and it is to be understood that the structure may be further modified and changed all within the true spirit and broad scope of the invention.

Fig. 1 is a broken part sectional view illustrating a form of the invention as applied to a fractionating column or the like.

Fig. 2 is a similar view illustrating a modification for extending the range of the gauge.

One of the distinguishing features of the invention is the provision of an additional or extra connection 5, with the top or upper portion of the still 6, above the usual top and bottom connections 7, 8, for the gauge column 9, and opening into the top of that column as indicated at 10.

This additional top connection enables a circulation of vapor between the middle and the top connection, that is, from point 5 through the extension 11, of the gauging column back into the still at 7, which by cooling causes a certain amount of condensation and which condensate dropping back in the connection 11, joins the standing column of the gauge and again re-enters the tower at the bottom connection 8.

By this induced circulation, the bottom part of the gauge column is made to contain a relatively fluid oil, which on cooling does not tend to high viscosity and due to the continual addition of such condensate, this oil flows through the bottom connection back into the tower, flushing back the heavy tarry bottoms and preventing them from entering the gauge column.

Preferably, the gauge column is insulated from the middle to the bottom connection as indicated at 12, and the upper extension 11 is left uninsulated from the middle connection 7 to the top connection 5.

Also the sump 13, which is shown provided in the intermediate portion of the gauge column 9, is preferably included in such insulation, so as to receive heat from the main part of the column.

The gauging instrument may be a differential gauge such as indicated generally at 14, connected by pressure lines 15, 16, with the lower end of the gauge column and with the sump respectively.

Other forms of gauges, either recording, or non-recording may be employed and the invention, in fact, makes it possible to even use tri-cocks or a gauge glass, connected in at desired points on the gauge column, since the oil maintained in the column as above described is kept relatively light and fluid.

In Fig. 1, there is shown a gauge glass at 17, direct connected at 18, 19, with that section of the gauge column between the lower connection and the sump. These side connections with the column are preferred, but it is possible that the gauge glass be located directly in the line of flow, since only a circulating distilled oil comes in contact with the glass, keeping it clean and easy to read.

For these same reasons, it will be obvious that tri-cocks may be connected in on the gauge column as the oil in this column is a clean distillate, which will prevent such cocks from choking from tar or coke.

To extend the location of the level range for a given differential meter, the construction may be modified as indicated in Fig. 2, that is, by providing an additional sump or sumps 13' between the bottom and middle, or intermediate gauge column connections 8, 7, with an overflow connection 20, from the upper into the lower, which latter, as in the first instance, has an overflow connection 21, to the bottom connection. Manifolding connections 22, between the sumps with upper and lower valves 23, 24, enable the reading to be taken either in the lower or upper range.

As shown in Fig. 2, the upper valve 23 is opened and the lower valve 24, is closed, so that the reading on the meter is taken in the level range between the upper and lower sump.

If the level in the column is below the lower sump, then valve 23 is closed and valve 24 is opened. The spacings may be such that the readings from one sump to the next will overlap.

The third connection between the tower and the top of the gauge column, by creating a circulation of vapor, forming condensate and delivering this condensate into the gauge column has the effect of keeping the gauge column liquid fresh and in non-viscous liquid condition, providing therefore accurate and reliable gauge readings. The vapors in the sump or sumps are automatically vented back to the tower, obviating any need for a special vapor vent and this construction avoids the filling up of the gauge column with fixed gases. The condensate falling down the gauge column is automatically trapped and to an extent sufficient to always provide a full level within the sump.

By maintaining a degree of circulation in the gauge column, there is no stagnation and hence no need for purging to clear the tarred lines and futhermore, the gauging action is steady, continuous and reliable.

In all forms of the invention, clean and fresh oil is automatically and continuously supplied for gauging purposes. In the external type of gauge column shown in Figs. 1 and 2, convenient checking of the gauge operation is made possible by providing a valve in the lower connection 8, as indicated at 29, which when closed will show that the gauge fluid is in proper circulation by the sump 13 filling up and bringing the meter back to zero reading. Then when this test valve 29 is opened, the sump should clear itself by the excess liquid dropping back through the lower end of the gauge column 9 and bottom connection 8 into the tower and bring the meter back to the first reading, providing a definite check that the gauge is in proper operating condition. Also, if desired, valves such as indicated at 30, 31, may be provided in the top and intermediate connections 5 and 7, to regulate the condensate feeding into the gauge column or to temporarily shut off the circulation for test purposes.

Other changes and modifications within the true intent of the invention may be made, as will be apparent from the broad scope of the claims.

What is claimed is:

1. A tower level indicator, comprising in combination with a tower a gauge column having top, bottom and intermediate tower connections, a level gauging instrument, said gauge column including sumps in the intermediate portion of the same and selectively usable connections from said sumps to said gauge instrument.

2. A tower level indicator, comprising in combination with a tower a gauge column having top, bottom and intermediate tower connections, a level gauging instrument, said gauge column including selectively usable sumps one above the other for extending the level reading range and valved connections from said different sumps to said instrument.

3. In combination with a fractionating tower, a liquid level indicating instrument therefor, a gauge column having connections with said indicating instrument and having top and intermediate connections with the vapor space of the tower and a bottom connection draining back into the liquid space in the bottom of the tower, and means for closing off said bottom connection for stopping flow from the lower end of the gauge column back into the tower and for observing and checking circulation as between the tower and gauge column through said top and intermediate connections.

4. In combination with a fractionating tower, a liquid level indicating instrument therefor, a gauge column having connections with said indicating instrument and having top and intermediate connections with the vapor space of the tower and a bottom connection draining back into the liquid space in the bottom of the tower, means for closing off said bottom connection for stopping flow from the lower end of the gauge column back into the tower and for observing and checking circulation as between the tower and gauge column through said top and intermediate connections and means for controlling said top and intermediate connections independently of the bottom connection for regulating the degree of circulation as between the tower and the gauge column.

5. In combination with a fractionating tower, a gauge column having top and intermediate connections open to the vapor space of the tower and a bottom connection draining back into the liquid space in the bottom of said tower, enabling vapor circulation from and into the tower through said intermediate and top connections respectively and consequent accumulation of condensate in the upper part of the column forcing liquid in the lower end of said gauge column back through the bottom connection into the fractionating tower, and a liquid level indicating instrument connected with separated portions of said self-flushing gauge column.

6. In combination with a fractionating tower, a gauge column having top, bottom and intermediate connections open to said tower, enabling vapor circulation from the tower through said intermediate and top connections of the gauge column and said bottom connection of the column being arranged to drain liquid from the gauge column back into the tower, a sump in an intermediate portion of the gauge column between the intermediate and bottom connections of the column with the tower, a liquid level indicating instrument having a connection with said sump and a connection with the column below the sump.

7. In a tower level indicator, the combination with a tower, of a gauge column having top, bottom and intermediate connections with said tower, sumps interposed one above the other in the gauge column between said intermediate and bottom tower connections, a level indicating instrument and means for interchangeably connecting said instrument with the different sumps to change the range of said indicating instrument.

JAMES W. GRAY.